US011282295B2

(12) United States Patent
Kang

(10) Patent No.: US 11,282,295 B2
(45) Date of Patent: Mar. 22, 2022

(54) IMAGE FEATURE ACQUISITION

(71) Applicant: Beijing Sankuai Online Technology Co., Ltd, Beijing (CN)

(72) Inventor: Liping Kang, Beijing (CN)

(73) Assignee: Beijing Sankuai Online Technology Co., Ltd, Beijing (CN)

(*) Notice: Subject to any disclaimer, the term of this patent is extended or adjusted under 35 U.S.C. 154(b) by 88 days.

(21) Appl. No.: 16/618,394

(22) PCT Filed: Dec. 20, 2017

(86) PCT No.: PCT/CN2017/117447
§ 371 (c)(1),
(2) Date: Dec. 1, 2019

(87) PCT Pub. No.: WO2019/015246
PCT Pub. Date: Jan. 24, 2019

(65) Prior Publication Data
US 2020/0293840 A1 Sep. 17, 2020

(30) Foreign Application Priority Data

Jul. 20, 2017 (CN) .......................... 201710598221.7

(51) Int. Cl.
*G06N 3/04* (2006.01)
*G06V 30/24* (2022.01)
(Continued)

(52) U.S. Cl.
CPC .......... *G06V 30/248* (2022.01); *G06K 9/6218* (2013.01); *G06K 9/6268* (2013.01); *G06N 3/02* (2013.01); *G06N 3/0454* (2013.01)

(58) Field of Classification Search
CPC ..................... G06T 7/0012; G06T 7/11; G06T 2207/20081; G06T 2207/20084;
(Continued)

(56) References Cited

U.S. PATENT DOCUMENTS

2009/0208106 A1 8/2009 Dunlop et al.
2017/0140248 A1 5/2017 Wang et al.

FOREIGN PATENT DOCUMENTS

CN 101859326 A 10/2010
CN 102054178 A 5/2011
(Continued)

OTHER PUBLICATIONS

Chennupati, Hierarchical Decomposition of Large Deep Networks, Dec. 2016 [retrieved Apr. 23, 2021], Thesis, Rochester Institute of Technology: Scholar Works, 90 pages. Retrieved: https://scholarworks.rit.edu/theses/9288/ (Year: 2016).*

(Continued)

*Primary Examiner* — Matthew C Bella
*Assistant Examiner* — Dennis Rosario
(74) *Attorney, Agent, or Firm* — Kilpatrick Townsend & Stockton LLP

(57) ABSTRACT

The present application provides an image feature acquisition method and a corresponding apparatus. According to an example of the method, a classification model may be trained by using preset classes of training images, and similar image pairs may be determined based on the training images; classification results from the classification model are tested by using verification images to determine nonsimilar image pairs; and the classification model is optimized based on the similar image pairs and the nonsimilar image pairs. In this way, the optimized classification model may be used to acquire image features.

13 Claims, 4 Drawing Sheets

(51) Int. Cl.
*G06K 9/62* (2022.01)
*G06N 3/02* (2006.01)

(58) Field of Classification Search
CPC ........... G06K 9/00288; G06K 9/00087; G06K 9/00718; G06K 9/00765; G06K 9/6215; G06K 9/6224; G06K 9/6262; G06K 9/6218; G06K 9/6256; G06K 9/6269; G06K 9/00147; G06K 9/6267; G06N 20/00; G06N 3/0454; A61B 5/7267; A61B 5/7264; G06F 16/285
See application file for complete search history.

(56) References Cited

FOREIGN PATENT DOCUMENTS

| | | |
|---|---|---|
| CN | 102117411 A | 7/2011 |
| CN | 103839279 A | 6/2014 |
| CN | 103955718 A | 7/2014 |
| CN | 104268552 A | 1/2015 |
| CN | 104268570 A | 1/2015 |
| CN | 104680516 A | 6/2015 |
| CN | 105335368 A | 2/2016 |
| CN | 106383891 A | 2/2017 |
| CN | 106897390 A | 6/2017 |
| JP | 2013250809 A | 12/2013 |
| JP | 2016024503 A | 2/2016 |
| JP | 2017027600 A | 2/2017 |
| TW | 201710949 A | 3/2017 |
| WO | 2012058481 A1 | 5/2012 |

OTHER PUBLICATIONS

Liong et al., Deep Coupled Metric Learning for Cross-Modal Matching, Dec. 29, 2016 (1st instance) [retrieved Apr. 23, 2021], IEEE Transactions on Multimedia, vol. 19, Issue: 6, Jun. 2017, pp. 1234-1244. Retrieved: https://ieeexplore.ieee.org/abstract/document/7801952 (Year: 2016).*
Balntas et al., BOLD—Binary online learned descriptor for efficient image matching, Jun. 7-12, 2015 [retrieved Apr. 23, 2021], 2015 IEEE Conference on Computer Vision and Pattern Recognition, pp. 2367-2375. Retrieved: https://ieeexplore.ieee.org/abstract/document/7298850 (Year: 2015).*
Faktor et al., "Clustering by Composition"—Unsupervised Discovery of Image Categories, Dec. 16, 2013 (1st instance) [retrieved Apr. 23, 2021], IEEE Transactions Pat Analysis and Machince Intellig, vol. 36, Issue: 6, Jun. 2014, pp. 1092-1106. Retrieved: https://ieeexplore.ieee.org/abstract/document/6684535 (Year: 2013).*
Boiman et al., Similarity by Composition, Dec. 2006 [retrieved Apr. 23, 2021], Neural Information Processing Systems (NIPS), 8 pages. Retrieved: http://www.weizmann.ac.il/math/irani/publications (Year: 2006).*
Isola et al., Learning Visual Groups From Co-Occurrences in Space and Time, Nov. 21, 2015 [retrieved Oct. 18, 2021], [archive online], Cornell Univertisty: arXiv, 11 pages. Retrieved: https://arxiv.org/abs/1511.06811 (Year: 2015).*
Japanese Patent Office Action, Office Action Issued in Application No. 2019-566310, dated Nov. 10, 2020, 7 pages. (Submitted with Machine Translation).
Korean Intellectual Property Office, Office Action Issued in Application No. 10-2019-7034731, dated Oct. 28, 2020, 11 pages. (Submitted with Machine Translation).
ISA State Intellectual Property Office of the People's Republic of China, International Search Report Issued in Application No. PCT/CN2017/117447, dated Apr. 17, 2018, WIPO, 4 pages.
State Intellectual Property Office of the People's Republic of China, Office Action and Search Report Issued in Application No. 201710598221.7, dated Jun. 1, 2019, 18 pages,(Submitted with Machine Translation).
TW Patent Office, Office Action Issued in Application No. 107110540, dated Nov. 30, 2018. 24 pages. (Submitted with Partial Translation).
Liang Lin et al, "Cross-Domain Visual Matching via Generalized Similarity Measure and Feature Learning", IEEE Transactions on Pattern Analysis and Machine Intelligence, May 13, 2016, 14 pages.
Shen Haihong et al, "Hierarchical B-CNN model guided by classification error for fine-grained classification", Journal of Image and Graphics, Jul. 16, 2017. 10 pages.
Ioffe S et al, "Accelerating deep network training by reducing internal covariate shift", arXiv preprint arXiv:1502.03167, 2015.11 pages.
Chopra S et al, "Learning a similarity metric discriminatively, with application to face verification", Computer Vision and Pattern Recognition, 2005. CVPR 2005. IEEE Computer Society Conference on. IEEE, 2005, 1: 539-546. 8 pages.
Yan Zhicheng et al, 2015 IEEE International Conference on Computer Vision, IEEE, "HD-CNN: Hierarchical Deep Convolutional Neural Networks for Large Scale Visual Recognition", Dec. 7, 2015, 10 pages.
Silva-Palacios Daniel et al, Procedia Computer Science, Elsevier, Amsterdam, NL, "Improving Performance of Multiclass Classification by Inducing Class Hierarchies", Jun. 12-14, 2017, 10 pages.
European Patent Office, Extended European Search Report Issued in Application No. 17918027.8, Jun. 9, 2020, Germany, 6 pages.
ISA State Intellectual Property Office of the People's Republic of China, Written Opinion of the International Searching Authority Issued in Application No. PCT/CN2017/117447, Apr. 17, 2018, WIPO, 9 pages.

* cited by examiner

|   | 1  | 2 | 3  | 4  | 5  | ... | 5000 |
|---|----|---|----|----|----|-----|------|
| 1 | 25 | 0 | 2  | 6  | 0  | ... | 0    |
| 2 | 0  |   | 30 | 1  | 0  | ... | 2    |
| 3 | 1  | 2 | 35 | 0  | 0  | ... | 4    |
| 4 | 1  | 2 | 0  | 26 | 0  | ... | 1    |
| 5 | 1  | 2 | 0  | 0  | 25 | ... | ...  |

...

| 5000 | 1 | 2 | 0 | 0 | 0 | ... | 30 |

FIG. 2

IMAGE FEATURE ACQUISITION

CROSS-REFERENCE TO RELATED APPLICATIONS

This patent application is the National Stage of International Application No. PCT/CN2017/117447, filed on Dec. 20, 2017, which claims priority to Chinese Patent Applications No. 201710598221.7, entitled "IMAGE FEATURE ACQUISITION METHOD AND APPARATUS AND ELECTRONIC DEVICE" and filed with the Chinese Patent Office on Jul. 20, 2017, the content of each of which is incorporated by reference in its entirety.

TECHNICAL FIELD

The present application relates to image feature acquisition.

BACKGROUND

Image features of products may be used for service logic or training of related models and are widely applied to different services such as search and recommendation. A main method for acquiring image features of products is classification model training. For example, features extracted by a feature expression layer of a classification model may be used as image features. If the quantity of classes for product images is relatively large, the classification model has relatively low accuracy. As a result, extracted image features may have reduced expressiveness for different classes of product images.

SUMMARY

The present application provides a method, to improve the expressiveness of acquired image features for images.

To resolve the foregoing problem, according to a first aspect of the present disclosure, an image feature acquisition method is provided, including: training a classification model by using preset classes of training images; testing classification results from the classification model by using verification images to determine nonsimilar image pairs; determining similar image pairs based on the training images; optimizing the classification model based on the similar image pairs and the nonsimilar image pairs; and acquiring image features by using the optimized classification model.

According to a second aspect of the present disclosure, an image feature acquisition apparatus is provided, including: a classification model training module, configured to train a classification model by using preset classes of training images; a nonsimilar image pair determining module, configured to test, by using verification images, classification results from the classification model trained by the classification model training module to determine nonsimilar image pairs; a similar image pair determining module, configured to determine similar image pairs based on the training images; a classification model optimization module, configured to optimize the classification model based on the similar image pairs and the nonsimilar image pairs; and an image feature acquisition module, configured to acquire image features by using the optimized classification model.

According to a third aspect of the present disclosure, an electronic device is provided, including a memory, a processor, and computer programs stored in the memory and executable by the processor, where the processor executes the computer programs to implement the foregoing image feature acquisition method.

According to a fourth aspect of the present disclosure, a computer readable storage medium storing computer programs is provided, where the programs are executed by the processor to implement the steps of the foregoing image feature acquisition method.

In the image feature acquisition method disclosed in the embodiments of the present application, a classification model is trained by using preset classes of training images, and similar image pairs are determined by using the training images; classification results from the classification model are tested by using verification images to determine nonsimilar image pairs relatively confusable to the classification model; and the classification model is optimized based on the similar image pairs and the nonsimilar image pairs, and image features are acquired by using the optimized classification model, so that image expressiveness of the acquired image features can be effectively improved. Confusable product image classes are determined based on classification results of verification images from an initially trained classification model, and nonsimilar image pairs are constructed based on the confusable product image classes, so that similar image pairs and the nonsimilar image pairs may be used together as training samples to optimize the initially trained classification model, thereby obtaining more accurate feature expression of product images.

BRIEF DESCRIPTION OF THE DRAWINGS

To describe the technical solutions of the embodiments of the present disclosure more clearly, the following briefly introduces the accompanying drawings required for describing the embodiments or the prior art. Apparently, the accompanying drawings in the following description show only some embodiments of the present disclosure, and a person of ordinary skill in the art may still derive other drawings from these accompanying drawings without creative efforts.

FIG. 2 is a schematic diagram of a confusion matrix generated in an embodiment of the present application;

DETAILED DESCRIPTION OF THE EMBODIMENTS

The following clearly and completely describes the technical solutions in the embodiments of the present application with reference to the accompanying drawings in the embodiments of the present application. Apparently, the described embodiments are some of the embodiments of the present application rather than all of the embodiments. All other embodiments obtained by a person of ordinary skill in the art based on the embodiments of the present application without creative efforts shall fall within the protection scope of the present application.

Figure 1:
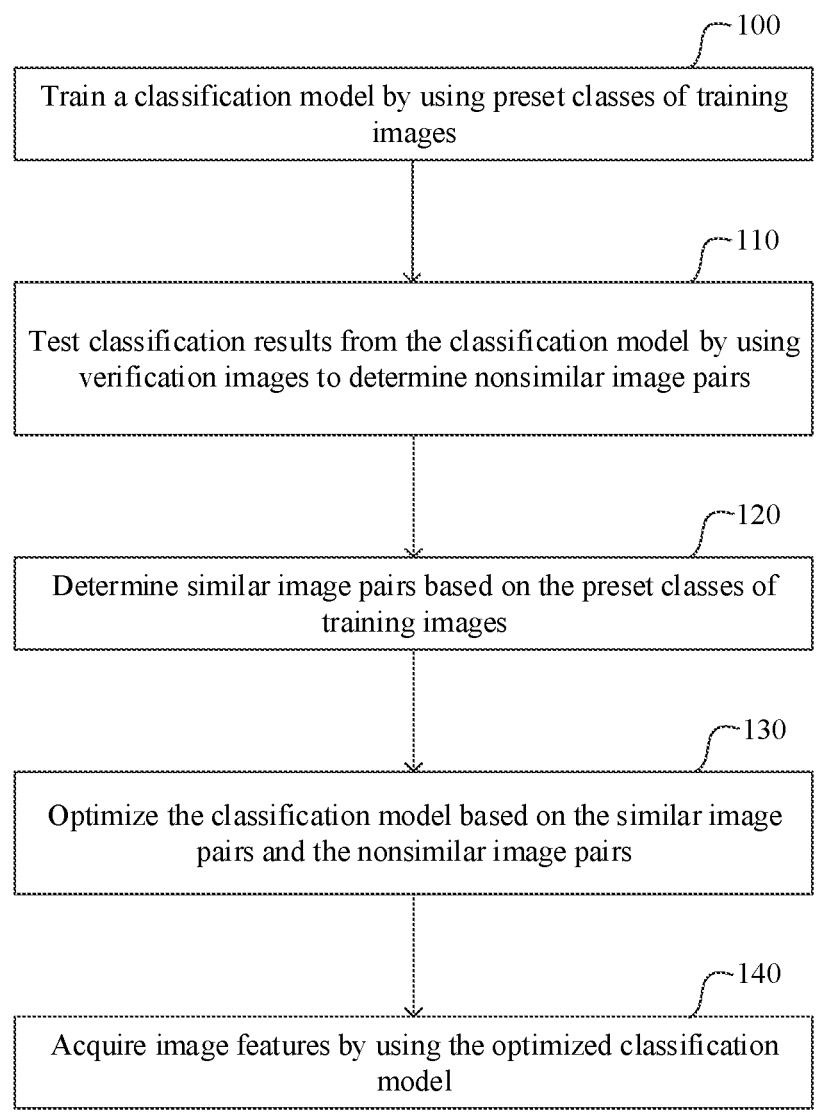
FIG. 1 is a flowchart of an image feature acquisition method according to an embodiment of the present application.

An embodiment discloses an image feature acquisition method. As shown in FIG. 1, the method may include step 100 to step 140.

Step 100: Train a classification model by using preset classes of training images.

For example, the classification model may be trained by using a deep convolutional neural network-based model. The classification model is a model for recognizing a class of a product based on an image of the product. During the training of the classification model, a large quantity of classes of product images may be used as training images. The product images may be, for example, food images from a food-ordering platform, clothing images from a clothing sales platform or scenic spot images from a travel consulting platform. A format of a training image for the deep convolutional neural network-based model may be (label, image), where "label" is a class label of an image, and "image" is a product image. Different classes of images are learned based on a deep convolutional neural network to train parameters of a product classification model and obtain optimal feature expression of each training image. Further, the classification model obtained through training may be used to classify other images to be recognized.

Step 110: Test classification results from the classification model by using verification images to determine nonsimilar image pairs relatively confusable to the classification model.

The classification model obtained through training may be used to classify input product images. However, because during the training of the classification model, class labels of the training images are manually set, or class labels are set by a user when the user uploads product images, labels may be inaccurate. In addition, only inter-class variance maximization is considered during the training of the classification model. Therefore, the classification model obtained through training may perform inaccurate classification, and verification data may need to be used to optimize the classification model.

The classes of the verification images are the same as those of the training images, and are, for example, 5000 classes. Each class may include a plurality of verification images. A genuine class label may be set for each verification image. Verification images with genuine class labels are input into the classification model obtained through training in step 100, and the classification model recognizes a class of each verification image. Next, classification results of each class output by the classification model may be analyzed to construct a confusion matrix. Each column of the confusion matrix represents a predicted class. A total quantity in each column represents a quantity of product images that are recognized to belong to the predicted class. Each row represents a genuine class of a product image. A total quantity in each row represents a quantity of product images that belong to the genuine class. A value in each column represents a quantity of verification images with a genuine class recognized as the predicted class. The confusion matrix records a class that is confused by the classification model.

Further, clustering analysis is performed on data in the confusion matrix to obtain confusable classes for the classification model. Images are then selected from confusable classes for the classification model to form the nonsimilar image pairs. For example, verification images from two confusable classes may form the nonsimilar image pairs.

Step 120: Determine similar image pairs based on the preset classes of training images.

The similar image pairs may be obtained based on the training images used to train the classification model. For example, a plurality of images are randomly selected from the training images in each class to form the similar image pairs.

Step 130: Optimize the classification model based on the similar image pairs and the nonsimilar image pairs.

The similar image pairs and the nonsimilar image pairs are used as an input, and the classification model may be optimized based on inter-class variance maximization and intra-class variance minimization. For example, an Inception and siamese network-based multitasking model may be constructed, and the similar image pairs and the nonsimilar image pairs are used to make fine adjustments to parameters of an Inception network-based classification model to optimize layers with feature expressiveness, for example, a feature expression layer (may also be referred to as fc1 layer) or a class output layer (may also be referred to as fc2 layer), of the classification model. When a model training task is completed, the parameters of the layers of an Inception network may be optimal. In other words, the feature expression layer (the fc1 layer) or the class output layer (the fc2 layer) of the Inception network-based classification model can optimally express features of product images.

Step 140: Acquire image features by using the optimized classification model.

If images to be processed, that is, images whose features are to be extracted, are input into the optimized classification model, after the optimized classification model performs recognition processing, the layers of the optimized classification model output corresponding parameters, so that image features of the images to be processed may be determined according to parameters of a layer with feature expressiveness.

In the image feature acquisition method disclosed in this embodiment of the present application, a classification model is trained by using preset classes of training images, classification results from the classification model are tested by using verification images, nonsimilar image pairs relatively confusable to the classification model are determined, similar image pairs are determined based on the training images, and the classification model is optimized based on the similar image pairs and the nonsimilar image pairs, so that the optimized classification model may be used to acquire image features, thereby effectively improving image expressiveness of the acquired image features. Product images confused by an initially trained classification model are determined based on classification results of verification images, and nonsimilar image pairs are constructed based on relatively confusable product image classes, so that the nonsimilar image pairs and similar image pairs may be combined to optimize the initially trained classification model, thereby obtaining more accurate feature expression of product images.

Training a classification model by using preset classes of training images may include: training a deep convolutional neural network-based classification model based on the concept of inter-class variance maximization and by using the preset classes of training images.

For example, 5000 classes of training images may be used. Each class of training images includes 10000 product images. After a class label is manually set for each product image, product images with class labels may be used to generate training data, for example, training data in a format (label, image), and the training data is used as an input to a deep convolutional neural network.

In addition, a deep convolutional neural network-based multitasking model may be constructed based on the concept of inter-class variance maximization to train the classification model. For example, an Inception deep-learning network-based multitasking model may be used to train the classification model, SoftmaxLoss is used as a loss function for class recognition, and image features are described from the perspective of increasing an inter-class variance. In this case, the training data formed by the 5000 classes of training images may be used as an input to train the classification model. When each training image is input into the classification model, parameters of the layers may be obtained. An fc1 layer may be used as a feature expression layer, and may be, for example, a 21841-dimensional vector. An fc2 layer may be used as a class output layer, and may be, for example, a 5000-dimensional vector. Each dimension represents a probability that the training image is classified into the class. For a specific method for training the classification model by using an Inception deep-learning network-based multitasking model, refer to any related technology well known to a person skilled in the art. Details are not described herein again.

In the foregoing step 110, testing classification results from the classification model by using verification images to determine nonsimilar image pairs relatively confusable to the classification model may include: classifying the verification images by using the classification model to obtain a confusion matrix; performing clustering analysis on the confusion matrix to determine confusable classes; and constructing the nonsimilar image pairs based on the determined confusable classes.

Classifying the verification images by using the classification model to obtain a confusion matrix may include: classifying the verification images by using the classification model to obtain a predicted class of each verification image; and constructing the confusion matrix according to genuine classes and predicted classes of all the verification images. For each row in the confusion matrix, each value in the row represents a quantity of verification images which are in a class corresponding to the row and classified into different classes.

The quantity of classes of the verification images may be the same as that of the training images. Each class includes a plurality of verification images. A genuine class label is set for each verification image. For example, there are 5000 classes of training images, and there are the same 5000 classes of verification images. Each class includes 40 verification images. A genuine class label is set for each verification image. Verification images with genuine class labels may be input into an initially trained classification model, so that the classification model recognizes the predicted class of each verification image.

Next, classification results of verification images in each class may be analyzed to construct the confusion matrix. If there are N classes of verification images, the confusion matrix is an N*N matrix. Each column of the confusion matrix represents a predicted class. A total quantity in each column represents a quantity of verification images that are recognized to belong to the predicted class. Each row represents a genuine class of a verification image. A total quantity in each row represents a quantity of verification images that belong to the class. A value in each column may represent a quantity of verification images with a genuine class recognized as the predicted class.

Figure 2:
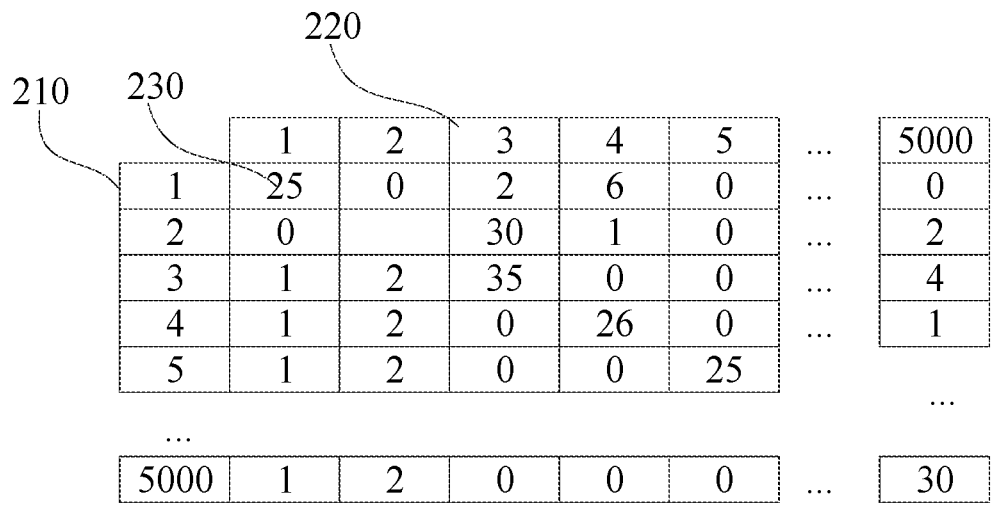

For example, there are 5000 classes of verification images, and class labels are 1 to 5000. Assuming that each class includes 40 verification images. As shown in FIG. 2, the confusion matrix is a 5000*5000 matrix. A column 210 represents genuine class labels of the verification images, and a row 220 represents a predicted class labels obtained by recognizing the verification images by the classification model. Each class has a total of 40 verification images. Therefore, a sum in each row is 40. For example, a matrix element 230 represents that 25 verification images belong to a genuine class of 1 and belong to a predicted class of 1. The confusion matrix records classes confused by the classification model.

Performing clustering analysis on the confusion matrix to determine confusable classes may include: performing clustering on the confusion matrix by using a spectral clustering method to obtain a plurality of clusters. The basic concept of spectral clustering is to use a similarity matrix (Laplacian matrix) between sample data to perform eigendecomposition. Each cluster includes at least one class, and classes in a cluster that includes at least two classes may be determined as mutually confusable classes.

A confusion matrix F is used as an example to describe below in detail a process of performing clustering analysis on the confusion matrix. First, the confusion matrix F may be used to construct a distance matrix M, and the formula is as follows:

$$M = \frac{1}{2}[(-F)+(I-F)^T],$$

where I is an identity matrix.

The distance matrix M may then be used to construct a Laplacian matrix L.

During the construction of the Laplacian matrix L, the distance matrix M may be used first to construct an adjacency matrix W as follows:

$$W_{ij} = e^{\frac{-M_{ij}}{t}}.$$

t represents that only information of first t locations with the smallest distance values in the distance matrix M are kept, and other locations are all set to 0. When a distance value is smaller, a corresponding value in the confusion matrix F is larger, indicating a higher probability of being confused by the classification model. For example, there are a relatively large quantity of samples whose genuine class A is recognized as a predicted class B.

N numbers may then be obtained by adding elements in each column of the adjacency matrix W. N is equal to a quantity of classes of training images used to train the classification model. The N numbers are placed in a diagonal of a degree matrix D, and elements at other locations in the degree matrix D are all set to 0 to obtain a diagonal matrix N×N.

Next, the adjacency matrix W and the degree matrix D may be used to construct the Laplacian matrix L, and the formula is as follows:

$$L = D - W.$$

Subsequently, eigendecomposition is performed on the Laplacian matrix L, and first k eigenvalues $\{\lambda\}_{i=1}^k$ of L and corresponding eigenvectors $\{v\}_{i=1}^k$ may be calculated. The k eigenvectors are arranged together to form one N×k matrix. Each row is regarded as one vector in a k-dimensional space. Each row is used as one K-dimensional vector, and N eigenvectors are arranged together to obtain N number of K-dimensional vectors. N is a quantity of rows of the Laplacian matrix L and is equal to the quantity of classes of training images used to train the classification model.

When eigendecomposition is performed on the Laplacian matrix, a dimensionality reduction manner may be used to perform dimensionality reduction. An eigenvector direction corresponding to a maximum eigenvalue includes a maximum amount of information. If there are very small amounts of information in several eigenvector directions, dimensionality reduction may be performed. For example, data in an eigenvector direction with a small eigenvalue may be deleted, and only data in eigenvector directions with large eigenvalues are kept. In this way, there is no significant change to the amount of usable information. Next, a K-means algorithm may be used to perform clustering on N number of K-dimensional vectors, to map N initial classes into different clusters.

Spectral clustering analysis is performed on the confusion matrix, and classes with confusable images may be clustered into a class. For example, a clustering result is 230 clusters. Each cluster includes at least one class. Classes in each cluster are mutually confusable classes during the recognition of product images. For example, a cluster includes class 1 and class 500. In this case, a product image in class 1 is very likely to be recognized by the classification model to belong to the class 500.

The nonsimilar image pairs are constructed based on the determined confusable classes.

A spectral clustering method is used to perform clustering analysis on the confusion matrix to obtain a clustering result with a plurality of clusters, for example, 230 clusters. Classes in each cluster are mutually confusable classes during the classification and recognition of product images. Therefore, verification images that belong to confusable classes in a same cluster may be used to construct the nonsimilar image pairs.

For example, clusters obtained through clustering include cluster 1, cluster 2, and cluster 3. Cluster 1 includes one class, cluster 2 includes four classes, and cluster 3 includes five classes. The following two cases that may occur during the construction of the nonsimilar image pairs are described.

In the first case, for a cluster with more than two classes, images that belong to different classes in the cluster may be selected to construct nonsimilar image pairs. For example, different classes in the cluster may be first selected to construct a class pair. At least one verification image is then randomly chosen for each class. Two verification images that belong to different classes are used to construct one nonsimilar image pair. If four classes included in cluster 2 are class 3, class 4, class 7, and class 30, six class pairs (3, 4), (3, 7), (3, 30), (4, 7), (4, 30), and (7, 30) may be obtained for cluster 2. Next, for the obtained six class pairs, at least one verification image corresponding to each class is respectively chosen, and two verification images that belong to different classes are used to construct one nonsimilar image pair. For example, for the class pair (3, 4), image 1 and image 2 that belong to class 3 may be chosen from the verification images, and image 15 and image 8 that belong to class 4 may be chosen from the verification images. Next, image 1 and image 15 form one nonsimilar image pair, and image 2 and image 8 form one nonsimilar image pair.

In the second case, for a cluster that includes only one class, images in the class in the cluster and images in Q number of classes randomly chosen from other clusters may be chosen to construct the nonsimilar image pairs. Q may be determined according to a specific requirement. For example, if a cluster has fewer than Q number of classes, all the classes in the cluster may be chosen. For example, Q is 10. Assuming that cluster 1 includes class 5 and cluster 2 includes class 3, class 4, class 7, and class 30, verification images that belong to class 5 in cluster 1 may be chosen to respectively construct the nonsimilar image pairs with verification images that belong to class 3, class 4, class 7, and class 30 in cluster 2.

In the foregoing step 120, when determining the similar image pairs based on the training images, a plurality of images may be randomly selected from each class of training images to form the similar image pairs. Still, for example, there are 5000 classes of training images. 60 images are randomly chosen from each class to form the similar image pairs. 30 similar image pairs may be obtained for each class. Based on 5000 classes of training images, 150000 similar image pairs may be obtained.

The similar image pairs and the nonsimilar image pairs may then be used to optimize the classification model, and the optimized classification model is used to acquire image features.

In the foregoing step 130, optimizing the classification model based on the similar image pairs and the nonsimilar image pairs may include: optimizing the classification model by using the similar image pairs and the nonsimilar image pairs and based on the concept of inter-class variance maximization and intra-class variance minimization. An image pair-based deep convolutional neural network model, for example, an Inception and siamese network-based multitasking model, may be first constructed. softmaxLoss is applied to classification and may measure a distance between a predicted class and a genuine class of an image. For example, initial parameters of an Inception model may be used as parameters of the classification model. ContrastiveLoss may be applied to a siamese network to measure a distance between a predicted class similarity degree and a genuine class similarity degree of an image pair. In an Inception network model, SoftmaxLoss may be used as a loss function for class recognition to describe the image features from the perspective of increasing an inter-class variance.

The basic model of a siamese network model is still an inception network. Therefore, initial parameters of some layers of the siamese network model may be the same as initial parameters of the Inception model. Initial parameters of unique layers of the siamese network model may be randomly initialized. The siamese network model may use the loss function ContrastiveLoss to measure a distance between similar image pairs in addition to measuring a distance between nonsimilar image pairs. Compared with the Inception network model that only uses SoftmaxLoss to measure a distance between images that belong to different classes, the siamese network model may further describe a similarity degree between images from the perspective of reducing an intra-class variance.

A process of optimizing the classification model may be considered as a process of performing secondary training based on the obtained parameters of the layers of the classification model, that is, a process of further training and optimizing the parameters of the layers of the classification model. For example, each similar image pair and each nonsimilar image pair may be used to generate training data in, for example, a format (img1, label1; img2, label2; if similar), and the training data in the format is input into the Inception and siamese network-based multitasking model. A task of the multitasking model is to minimize the loss function SoftmaxLoss of an Inception network and the loss function ContrastiveLoss of a siamese network.

When a model training task is completed, the parameters of the layers of the Inception network may be optimized. Parameters of a feature expression layer (that is, the fc1 layer) of the Inception network model is optimized, which may represent that eigenvectors output by the feature expression layer of the Inception network model has the best expressiveness for features of product images. Parameters of the class output layer (that is, the fc2 layer) of the Inception network model is optimized, which may represent that eigenvectors output by the class output layer of the Inception network model express optimal classification results of product images.

In the foregoing step 140, acquiring image features by using the optimized classification model may include: using images to be processed as an input of the optimized classification model; and acquiring image features of the input images based on an output of a layer with feature expressiveness of the optimized classification model. Image features of input images may be determined according to the output of the layer with feature expressiveness of the optimized classification model. For example, 5000 classes of images are used as an input. When a model training task is completed, if it is chosen to determine the image features of the input images according to an output of the fc1 layer, 21841-dimensional eigenvectors output by the fc1 layer of the Inception network may be used as the image features of the input images. If it is chosen to determine the image features of the input images according to an output of the fc2 layer, 5000-dimensional eigenvectors output by the fc2 layer may be used as the image features of the input images. Each dimensionality of the 5000-dimensional eigenvectors represents a probability that an input image is classified into the class. In addition, according to a specific service requirement, it may be chosen to determine image features of products according to the output the fc1 layer or the fc2 layer of the Inception network.

In the image feature acquisition method disclosed in this embodiment of the present application, first, a large quantity of product images are used to pre-train a deep convolutional neural network-based classification model to obtain image feature expression with a relatively large inter-class variance. Spectral clustering analysis is then performed on a confusion matrix constructed by using classification results of a verification data set by the pre-trained classification model. Confusable product classes may be clustered into a cluster. Confusable product classes in a same cluster are used to construct nonsimilar image pairs. Training images that belong to a same class are used to construct similar image pairs. Next, a multitasking model for classification and similarity degree comparison may be jointly optimized by using the similar image pairs and the nonsimilar image pairs. In this way, while an inter-class variance between confusable classes is further increased, similar image pairs may be used to implement update and learning of shared parameters of a deep convolutional neural network, so that an intra-class variance can be effectively reduced and feature expressiveness of a classification model for images is improved.

Figure 3:
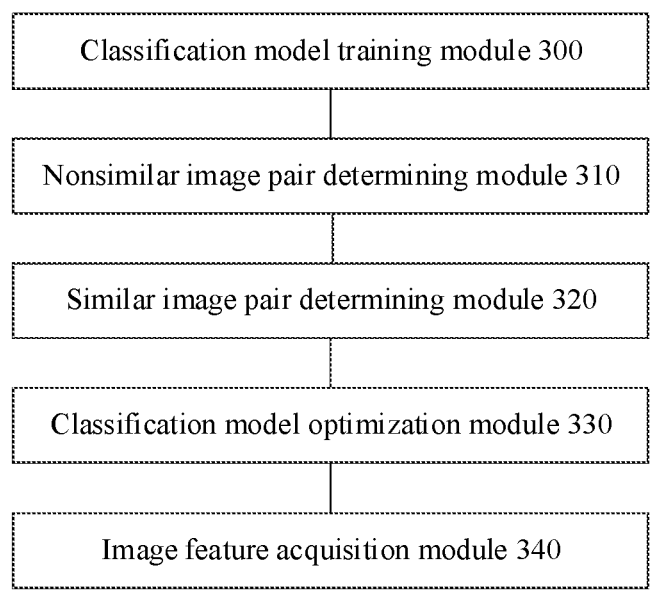
FIG. 3 is a schematic structural diagram of an image feature acquisition apparatus according to an embodiment of the present application.

An embodiment discloses an image feature acquisition apparatus. As shown in FIG. 3, the apparatus includes: a classification model training module 300, configured to train a classification model based on preset classes of training images; a nonsimilar image pair determining module 310, configured to test classification results from the classification model by using verification images to determine nonsimilar image pairs relatively confusable to the classification model; a similar image pair determining module 320, configured to determine similar image pairs based on the training images; a classification model optimization module 330, configured to optimize the classification model based on the similar image pairs and the nonsimilar image pairs; and an image feature acquisition module 340, configured to acquire the image features of the input images by using the optimized classification model.

Figure 4:
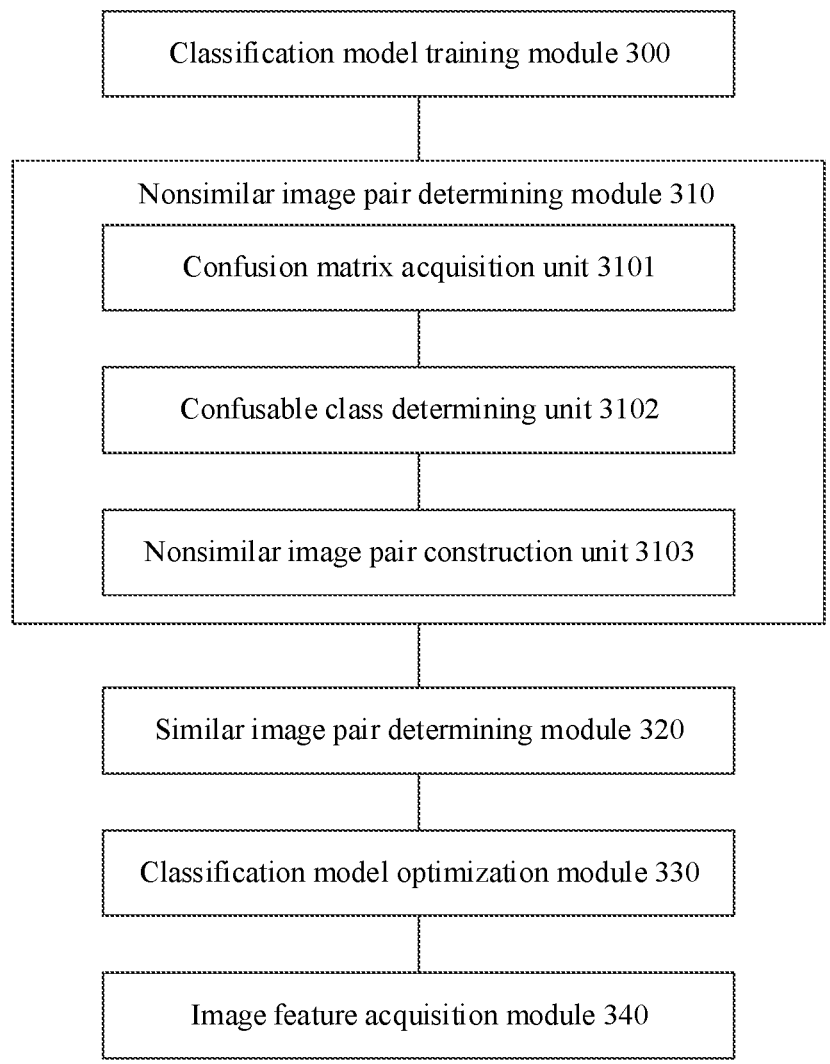
FIG. 4 is a schematic structural diagram of an image feature acquisition apparatus according to another embodiment of the present application.

As shown in FIG. 4, the nonsimilar image pair determining module 310 may include: a confusion matrix acquisition unit 3101, configured to classify the verification images by using the classification model to obtain a confusion matrix; a confusable class determining unit 3102, configured to perform clustering analysis on the confusion matrix to determine confusable classes; and a nonsimilar image pair construction unit 3103, configured to construct the nonsimilar image pairs based on the verification images that belong to the confusable classes.

The confusion matrix acquisition unit 3101 may further be configured to: classify the verification images by using the classification model to obtain a predicted class of each verification image; and construct the confusion matrix according to genuine classes and predicted classes of all the verification images, where for each row in the confusion matrix, a value of each column is a quantity of verification images which are in a class corresponding to the row and classified into different classes.

The confusable class determining unit 3102 may further be configured to: perform clustering on the confusion matrix to obtain a plurality of clusters, where each cluster includes at least one class; and determine classes in a cluster that includes at least two classes as mutually confusable classes.

The classification model optimization module 330 may further be configured to optimize the classification model by using the similar image pairs and the nonsimilar image pairs and based on inter-class variance maximization and intra-class variance minimization.

The classification model training module 300 may further be configured to train a deep convolutional neural network-based classification model based on inter-class variance maximization and by using the preset classes of training images.

The image feature acquisition module 340 may further be configured to: acquire an output of a layer with feature expressiveness in the optimized classification model by using images to be processed as an input of the optimized classification model, and use the output as image features of the images to be processed.

In the image feature acquisition apparatus disclosed in this embodiment of the present application, a classification model is trained by using preset classes of training images, classification results from the classification model are tested by using verification images to determine nonsimilar image pairs relatively confusable to the classification model, and the classification model is optimized based on the similar image pairs and the nonsimilar image pairs that are determined by using the training images, so that image features can be acquired by using the optimized classification model, thereby effectively improving image expressiveness of the acquired image feature.

In the image feature acquisition apparatus disclosed in this embodiment of the present application, a large quantity of product images are used to pre-train a deep convolutional neural network-based classification model to obtain image feature expression with a relatively large inter-class variance. Spectral clustering analysis is performed on a confusion matrix constructed by using classification results of a verification data set by the deep convolutional neural network-based classification model, confusable product classes are clustered into a cluster, and confusable product classes in a same cluster are used to construct nonsimilar image pairs. A multitasking model may be jointly optimized based on similar image pairs constructed by using training images that belong to a same class and the nonsimilar image pairs, so that an intra-class variance can be reduced while an inter-class variance between confusable classes is further increased, thereby effectively improving the expressiveness of the classification model for image features.

Correspondingly, the present application further discloses an electronic device, including a memory, a processor, and computer programs stored in the memory and executable by the processor. The processor executes the computer programs to implement the foregoing image feature acquisition method. The electronic device may be a personal computer (PC), a mobile terminal, a personal digital assistant (PDA), a tablet computer or the like.

The present application further discloses a computer readable storage medium storing computer programs, where the programs are executed by a processor to implement the steps of the foregoing image feature acquisition method.

It should be noted that the embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

The image feature acquisition method and apparatus of the present application are described in detail above. The principle and implementation of the present application are described herein through specific examples. The description about the embodiments of the present application is merely provided for ease of understanding of the method and core ideas of the present application. Persons of ordinary skill in the art can make variations and modifications to the present application in terms of the specific implementations and application scopes according to the ideas of the present application. Therefore, the specification shall not be construed as a limit to the present application.

Through the above description of the implementation, it is clear to persons skilled in the art that in the foregoing implementations may be accomplished through software plus a necessary general-purpose hardware platform or may be certainly implemented through hardware. Based on this, the technical solutions of the present disclosure essentially or the part that contributes to the prior art may be embodied in the form of a software product. The computer software product may be stored in a computer readable storage medium such as a read-only memory (ROM)/random access memory (RAM), a magnetic disk or an optical disc and contain several instructions adapted to instruct a computer device (for example, a personal computer, a server, or a network device) to perform the method according to the embodiments or some of the embodiments.

The invention claimed is:

1. An image feature acquisition method, comprising:
   training a siamese network-based classification model by using preset classes of training images;
   testing classification results from the siamese network-based classification model by using verification images to determine nonsimilar image pairs in the verification images;
   determining similar image pairs based on the training images;
   optimizing the siamese network-based classification model based on the similar image pairs and the nonsimilar image pairs; and
   acquiring image features by using the optimized classification model;
   wherein testing classification results from the siamese network-based classification model by using verification images to determine nonsimilar image pairs in the verification images comprises:
   classifying the verification images by using the siamese network-based classification model to obtain a confusion matrix;
   performing clustering analysis on the confusion matrix to determine confusable classes; and
   constructing the nonsimilar image pairs in the verification images based on the determined confusable classes.

2. The method according to claim 1, wherein classifying the verification images by using the siamese network-based classification model to obtain a confusion matrix comprises:
   classifying the verification images by using the siamese network-based classification model to obtain a predicted class of each of the verification images; and
   constructing the confusion matrix according to a genuine class and the predicted class of each of the verification images,
   wherein for each of rows in the confusion matrix, a value of each column in the row is a quantity of verification images which are in a class corresponding to the row and classified into different classes.

3. The method according to claim 1, wherein performing clustering analysis on the confusion matrix to determine confusable classes comprises:
   performing spectral clustering analysis on the confusion matrix to obtain a plurality of clusters, wherein each of the plurality of the clusters comprises at least one class; and
   determining classes in a cluster that comprises at least two classes as the confusable classes.

4. The method according to claim 1, wherein optimizing the siamese network-based classification model based on the similar image pairs and the nonsimilar image pairs comprises:
   optimizing the siamese network-based classification model based on inter-class variance maximization and intra-class variance minimization and by using the similar image pairs and the nonsimilar image pairs.

5. The method according to claim 1, wherein training the siamese network-based classification model by using preset classes of training images comprises:
   training a deep convolutional neural network-based classification model based on inter-class variance maximization and by using the preset classes of training images.

6. The method according to claim 1, wherein acquiring image features by using the optimized classification model comprises:
   using images to be processed as an input of the optimized classification model,
   acquiring an output of a layer with feature expressiveness in the optimized classification model, and
   using the output as image features of the images to be processed.

7. An electronic device, comprising:
   a memory,
   a processor, and
   computer programs stored in the memory and executable by the processor,
   wherein the processor executes the computer programs to implement operations comprising:
   training a siamese network-based classification model by using preset classes of training images;

testing classification results from the siamese network-based classification model by using verification images to determine nonsimilar image pairs in the verification images;

determining similar image pairs based on the training images;

optimizing the siamese network-based classification model based on the similar image pairs and the nonsimilar image pairs; and acquiring image features by using the optimized classification model;

wherein the operation of testing classification results from the siamese network-based classification model by using verification images to determine nonsimilar image pairs in the verification images further comprises:

classifying the verification images by using the siamese network-based classification model to obtain a confusion matrix;

performing clustering analysis on the confusion matrix to determine confusable classes; and constructing the nonsimilar image pairs in the verification images based on the determined confusable classes.

8. The electronic device according to claim 7, wherein the operation of classifying the verification images by using the siamese network-based classification model to obtain a confusion matrix further comprises:

classifying the verification images by using the siamese network-based classification model to obtain a predicted class of each of the verification images; and constructing the confusion matrix according to a genuine class and the predicted class of each of the verification images, wherein for each of rows in the confusion matrix, a value of each column in the row is a quantity of verification images which are in a class corresponding to the row and classified into different classes.

9. The electronic device according to claim 7, wherein the operation of performing clustering analysis on the confusion matrix to determine confusable classes further comprises:

performing spectral clustering analysis on the confusion matrix to obtain a plurality of clusters, wherein each of the plurality of the clusters comprises at least one class; and determining classes in a cluster that comprises at least two classes as the confusable classes.

10. The electronic device according to claim 7, wherein the operation of optimizing the siamese network-based classification model based on the similar image pairs and the nonsimilar image pairs further comprises:

optimizing the siamese network-based classification model based on inter-class variance maximization and intra-class variance minimization and by using the similar image pairs and the nonsimilar image pairs.

11. The electronic device according to claim 7, wherein the operations comprising training the siamese network-based classification model by using preset classes of training images comprise further an operation:

training a deep convolutional neural network-based classification model based on inter-class variance maximization and by using the preset classes of training images.

12. The electronic device according to claim 7, wherein the operation of acquiring image features by using the optimized classification model further comprises:

using images to be processed as an input of the optimized classification model, acquiring an output of a layer with feature expressiveness in the optimized classification model, and using the output as image features of the images to be processed.

13. A non-transitory computer readable storage medium storing computer programs, wherein the programs are executed by a processor to implement operations comprising:

training a siamese network-based classification model by using preset classes of training images;

testing classification results from the siamese network-based classification model by using verification images to determine nonsimilar image pairs in the verification images;

determining similar image pairs based on the training images;

optimizing the siamese network-based classification model based on the similar image pairs and the nonsimilar image pairs; and acquiring image features by using the optimized classification model;

wherein testing classification results from the siamese network-based classification model by using verification images to determine nonsimilar image pairs in the verification images comprises:

classifying the verification images by using the siamese network-based classification model to obtain a confusion matrix;

performing clustering analysis on the confusion matrix to determine confusable classes; and constructing the nonsimilar image pairs in the verification images based on the determined confusable classes.

* * * * *